United States Patent
Eck

(10) Patent No.: US 6,561,041 B1
(45) Date of Patent: May 13, 2003

(54) PRODUCTION METERING AND WELL TESTING SYSTEM

(75) Inventor: Daniel J. Eck, Anchorage, AK (US)

(73) Assignee: Conocophillips Company, Houston, TX (US)

( * ) Notice: Subject to any disclaimer, the term of this patent is extended or adjusted under 35 U.S.C. 154(b) by 0 days.

(21) Appl. No.: 09/996,330

(22) Filed: Nov. 28, 2001

(51) Int. Cl.$^7$ .................................................. G01F 1/00
(52) U.S. Cl. ..................................................... 73/861.04
(58) Field of Search ............................... 73/861.04, 200, 73/195; 166/250.01

(56) References Cited

U.S. PATENT DOCUMENTS

| | | |
|---|---|---|
| 4,773,257 A | 9/1988 | Aslesen et al. |
| 4,962,666 A * | 10/1990 | Adney et al. .................. 73/1.31 |
| 5,048,348 A | 9/1991 | Durrett et al. |
| 5,461,930 A * | 10/1995 | Farchi et al. .................. 73/195 |
| 5,597,961 A | 1/1997 | Marrelli |
| 5,608,170 A | 3/1997 | Atkinson et al. |
| 5,654,502 A | 8/1997 | Dutton |
| 5,680,899 A | 10/1997 | Waid et al. |
| 6,318,156 B1 * | 11/2001 | Dutton et al. ............. 73/861.04 |

* cited by examiner

Primary Examiner—Hezron Williams
Assistant Examiner—Takisha S Miller
(74) Attorney, Agent, or Firm—Kameron D. Kelly

(57) ABSTRACT

A system for measuring and monitoring multi-phase fluid production of a plurality of individual wells, each operating as part of a common production field. Upstream multi-phase flow measurements are simultaneously taken at each individual well. Downstream multi-phase flow measurements are taken at a point where the production from the entire field is combined. The downstream multi-phase flow measurement is allocated back to each individual well based on the measured upstream multi-phase flow for each individual well.

27 Claims, 3 Drawing Sheets

PRODUCTION METERING AND WELL TESTING SYSTEM

BACKGROUND OF THE INVENTION

1. Field of the Invention

The present invention relates generally to the production of hydrocarbon-containing fluids from subterranean formations. In another aspect, the invention concerns a system for measuring and monitoring the production of a plurality of individual wells, each operating as part of a common production field. In a further aspect, the invention concerns a system for more accurately measuring and continuously monitoring the production of oil, gas, and water from individual hydrocarbon wells, each operating as part of a common production field.

2. Discussion of Prior Art

Conventional systems for measuring and monitoring the production of individual wells in a common production field require an individual to manually perform monthly tests on each well in the field. Each test typically consumes approximately 2 to 8 man-hours and thus, is a labor intensive undertaking, particularly for fields with a high number of individual wells. Further, the results from such manual, monthly individual well tests are suspect due to the limited number of data points collected and the integrity of the testing system if not properly maintained. A typical well testing system may include a test header which is connected in parallel by a plurality of valves with a production header so that production from an individual well can be directed through the test header while the production of the remaining wells is directed through the production header. Such a test header can be costly to install and maintain.

In many areas where hydrocarbons are produced from subterranean formations, in particular the area known as the North Slope of Alaska, periodic manual well tests, as described above, are being used for the custody transfer of unprocessed production between oil fields upstream of the final processing plant. For custody transfer purposes, a minimum of two well tests per month on each well, and additional well tests within 24 hours of any significant operational change of the well is required. Further, a full time surveillance engineer is required to validate the well testing and production allocation process. Using this method for custody transfer requires a significant capital expenditure to standardize all well testing equipment.

OBJECTS AND SUMMARY OF THE INVENTION

Responsive to these and other problems, an object of the present invention is to provide a system for measuring and monitoring individual well production without requiring time-consuming, periodic, manual, individual well tests.

A further object of the present invention is to provide a well production measuring and monitoring system which continuously monitors the production of each individual well.

A still further object of the present invention is to provide an individual well production measuring and monitoring system which allows for the elimination of costly test headers.

An even further object of the present invention is to provide a system for more accurately measuring the production of a plurality of individual wells operating as part of a common production field.

It should be noted that the above-listed objects need not all be accomplished by the invention claimed herein, and other objects and advantages of this invention will be apparent from the following description of the invention and appended claims.

In accordance with one embodiment of the present invention, a method of determining fluid production from a plurality of individual hydrocarbon wells is provided. The method comprises the steps of: (a) simultaneously measuring a plurality of individual well multi-phase flow measurements, each indicative of the fluid produced by a respective one of the individual wells; (b) measuring a combined multi-phase flow measurement of the combined fluid cooperatively produced by all of the individual wells; and (c) allocating the combined multi-phase flow measurement from step (b) to each of the individual wells based on the individual well multi-phase flow measurements from step (a) to thereby determine an adjusted individual well multi-phase flow measurement for each individual well, the adjusted individual well multi-phase flow measurements providing a more reliable indication of actual multi-phase fluid production from each individual well than the individual well multi-phase flow measurements from step (a).

In accordance with another embodiment of the present invention, a method of determining fluid production from a plurality of individual hydrocarbon wells is provided. The method comprises the steps of: (a) simultaneously measuring an upstream multi-phase flow of the fluid produced by each individual well; (b) generating a plurality of upstream flow signals each indicative of the upstream multi-phase flow of a respective individual well; (c) measuring a downstream multi-phase flow of the combined fluid cooperatively produced by all of the individual wells; (d) generating a downstream flow signal indicative of the downstream multi-phase flow of all the individual wells; and (e) computing an adjusted upstream multi-phase flow measurement based on the upstream and downstream flow signals by allocating the downstream multi-phase flow to each individual well based on the upstream multi-phase flow, the adjusted multi-phase flow measurement provides a more accurate indication of the actual multi-phase flow of the fluid produced by each individual well than the upstream multi-phase flow measured in step (a).

In accordance with a further embodiment of the present invention, a method of determining fluid production from a plurality of individual hydrocarbon wells is provided. The method comprises the steps of: (a) simultaneously measuring a plurality of upstream gas flow rates, each indicative of the flow rate of an upstream gas-phase component of the fluid produced by an individual well; (b) simultaneously measuring a plurality of upstream liquid flow rates each indicative of the flow rate of an upstream liquid-phase component of the fluid produced by an individual well; (c) measuring a plurality of upstream water-cuts each indicative of the amount of water in the upstream liquid-phase component of the fluid produced by an individual well; (d) physically combining the fluids produced by all of the individual wells into a combined flow; (e) physically separating the combined flow into a downstream gas-phase cut and a downstream liquid-phase cut; (f) measuring a downstream gas flow rate indicative of the flow rate of the downstream gas-phase cut; (g) measuring a downstream liquid flow rate indicative of the flow rate of the downstream liquid-phase cut; and (h) physically recombining the downstream gas-phase cut and the downstream liquid-phase cut.

In accordance with a still further embodiment of the present invention, an apparatus for measuring fluid production from a plurality of individual wells is provided. The apparatus generally comprises a plurality of upstream metering devices and a downstream metering device. Each of the upstream metering devices are adapted to be fluidically coupled to a respective individual well. Each of the upstream metering devices is operable to measure an upstream gas flow rate and an upstream liquid flow rate of the fluid produced by a respective individual well. The downstream metering device is adapted to be fluidically coupled to all of the individual wells and is operable to measure a downstream gas flow rate and a downstream liquid flow rate of the combined fluid cooperatively produced by all the individual wells.

In accordance with still another embodiment of the present invention, an apparatus for measuring fluid production from a plurality of individual hydrocarbon wells is provided. The apparatus generally comprises a plurality of upstream metering devices, a downstream metering device, and a computing device. Each of the upstream metering devices is adapted to be fluidically coupled to a respective individual well. Each of the upstream metering devices is operable to measure an upstream multi-phase flow of the fluid produced by a respective individual well. Each of the upstream metering devices is operable to generate an upstream flow signal indicative of the upstream multi-phase flow of the respective individual well. The downstream metering device is adapted to be fluidically coupled to all of the individual wells. The downstream metering device is operable to measure a downstream multi-phase flow of the combined fluid produced by all of the individual wells. The downstream metering device is operable to generate a downstream flow signal indicative of the downstream multi-phase flow of the combined fluid produced by all the individual wells. The computing device is operable to receive the upstream and downstream flow signals and compute a plurality of adjusted multi-phase individual well flow measurements by allocating the downstream multi-phase flow to each individual well based on the upstream multi-phase flow for each individual well.

BRIEF DESCRIPTION OF THE DRAWING FIGURES

Preferred embodiments of the invention are described in detail below with reference to the attached drawing figures, wherein.

DETAILED DESCRIPTION OF THE PREFERRED EMBODIMENTS

Figure 1:
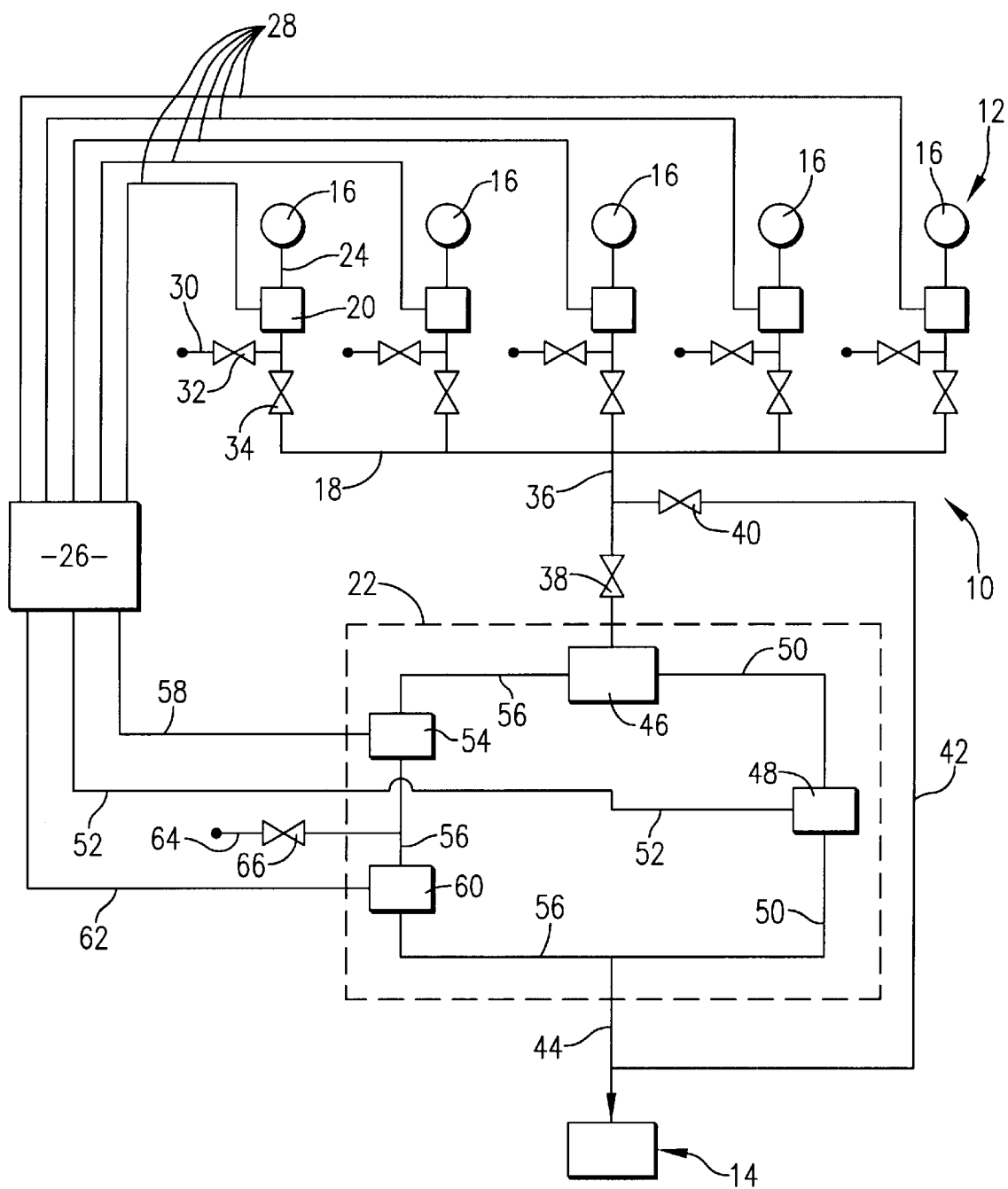
FIG. 1 is a schematic flow diagram showing a production metering and well testing system in accordance with one embodiment of the present invention in relation to a plurality of individual hydrocarbon-producing wells.

Referring initially to FIG. 1, a production metering and well testing system 10 in accordance with a preferred embodiment of the present invention is illustrated as being employed in conjunction with a satellite production field 12 which supplies a produced fluid to a central processing facility 14. Satellite production field 12 generally includes a plurality of individual wells 16 operable to extract various fluids, such as oil, gas, and water, from subterranean formations. The produced fluid from individual wells 16 is physically combined in a production header 18 prior to being transported to central processing facility 14. Central processing facility 14 generally receives fluids produced from a number of satellite production fields (such as production field 12). Central processing facility 14 typically includes various separators for separating the gas, oil, and water produced by the satellite production fields. The oil recovered in central processing facility 14 can then be sent away from central processing facility 14 for further processing or transportation.

Production metering and well testing system 10 generally includes a plurality of upstream flow meters 20 and a single downstream flow meter 22 associated with each production field 12.

Each upstream flow meter 20 is fluidically intercoupled between a respective individual well 16 and production header 18 via a well production line 24. The fluid produced by individual well 16 is passed through upstream flow meter 20 wherein multi-phase flow of the fluid produced by individual well 16 is measured. As used herein, the term "multi-phase flow" shall mean the respective flow rates of more than one phase of fluid such as, for example, the flow rate of a liquid-phase fluid and the flow rate of a gas-phase fluid. Preferably, upstream flow meters 20 continuously measure multi-phase flow from each individual well 16. As used herein, the term "continuously" shall mean at intervals of less than 1 hour. Most preferably, upstream flow meters 20 are operable to simultaneously measure multi-phase flow from individual wells 16 for uninterrupted measurement periods of more than 1 hour.

Upstream flow meters 20 are preferably operable to generate electrical upstream flow signals indicative of the multi-phase flow of the fluid produced by the individual well 16 with which that upstream flow meter 20 is associated. The upstream flow signals generated by upstream flow meters 20 are preferably transmitted to a computing device 26 via upstream signal lines 28.

Upstream flow meters 20 are preferably operable to measure two-phase flow (i.e., liquid and gas flow rates) of the fluid produced by individual wells 16. Thus, the upstream flow signals generated by upstream flow meters 20 generally include an upstream gas-phase component indicative of the upstream gas-phase flow rate of the fluid produced by individual wells 16 and an upstream liquid-phase component indicative of the upstream liquid-phase flow rate of the fluid produced by individual wells 16. Upstream flow meters 20 preferably measure multi-phase flow without physically separating the individual phases. A number of flow meters capable of measuring two-phase flow without separating the phases are known in the art. It is preferred for each upstream flow meter 20 to include a venturi meter, a pair of differential pressure transmitters for measuring differential pressure and transmitting a signal indicative of the measured differential pressure, and a computing device programmed to calculate upstream gas and liquid flow rates based on the differential pressures measured by the differential pressure transmitters. Suitable two-phase flow meters are available from FMC Measurement Solutions of Houston, Tex.

Because the measured liquid-phase flow rate of the fluid produced by individual wells 16 typically includes the flow rate of both oil and water present in the produced fluid, each well production line 24 includes a water-cut sample line 30 from which periodic fluid samples can be taken by opening and closing a water-cut valve 32. These periodic samples are analyzed by any suitable method known in the art to determine an upstream water-cut of the liquid phase of the fluid produced by each individual well 16. As used herein, the term "water-cut" shall mean the ratio of water to non-water compounds in a fluid stream. The measured water-cut can be used to readily determine the flow rate of the water fraction and non-water fraction of a fluid stream when the total flow rate of the fluid stream is known. Once the upstream water-cut ratio is determined, it can be inputted into computing device 26 where it is used to calculate the upstream oil flow rate and the upstream water flow rate from the measured upstream liquid-phase flow rate. Each well production line 24 can also include a shut-off valve 34 for terminating the flow from a respective individual well 16 to production header 18.

After the fluids produced by individual wells 16 are combined in production header 18, the combined fluid flows downstream to downstream flow meter 22 via a combined line 36. During normal operation of downstream flow meter 22, a common line valve 38 remains open to allow the combined flow in line 36 to enter downstream flow meter 22. However, in the event that it is desired to bypass downstream flow meter 22 (e.g., for repair or replacement of downstream flow meter 22), common line valve 38 can be closed and bypass valve 40 can be opened to allow the combined fluid to flow directly to central processing facility 14 via bypass line 42 and a pipeline 44.

During normal operation of downstream flow meter 22, the combined fluid cooperatively produced by individual wells 16 of production field 12 passes through combined line 36 and into a phase separator 46 of downstream flow meter 22. In phase separator 46, the combined fluid is physically separated into a downstream gas-phase cut and a downstream liquid-phase cut. Phase separator 46 can be any phase separator known in the art to be suitable for separating the gas phase comprising natural gas from a liquid phase comprising oil and water.

The downstream gas-phase cut exits phase separator 46 and is conducted to a gas flow meter 48 of downstream flow meter 22 via a gas-phase line 50. In gas flow meter 48 the flow rate of the downstream gas-phase cut is continuously measured. Gas flow meter 48 is operable to generate a downstream gas-phase signal indicative of the flow rate of the downstream gas-phase cut. Such downstream gas-phase signal is transmitted via a downstream gas signal line 52 to computer 26. After measurement of the downstream gas-phase flow rate in the gas flow meter 48, the downstream gas-phase cut exits gas flow meter 48 via gas-phase line 50.

The downstream liquid-phase cut exits phase separator 46 and is conducted to a liquid flow meter 54 of downstream flow meter 22 via a liquid phase line 56. In liquid flow meter 54, the flow rate of the downstream liquid-phase cut is measured. Liquid flow meter 48 is operable to generate a downstream liquid-phase signal indicative of the flow rate of the downstream liquid-phase cut. Such downstream liquid-phase signal is transmitted via a downstream liquid signal line 58 to computing device 26.

After measurement of the downstream liquid-phase flow rate in liquid flow meter 54, the downstream liquid-phase cut is conducted via liquid phase line 56 to a water-cut meter 60 of downstream flow meter 22. In water-cut meter 60 the water-cut of downstream liquid-phase cut is continuously measured. Water-cut meter 60 is operable to generate a downstream water-cut signal indicative of the water-cut of the downstream liquid-phase cut. Such downstream water-cut signal is transmitted via a downstream water-cut signal line 62 to computing device 26.

An optional downstream water-cut sample line 64 can be installed in liquid-phase line 56 in addition to, or in the place of, water-cut meter 60. When downstream water-cut line 64 is used to replace water-cut meter 60, the water-cut of the downstream liquid-phase cut can be manually sampled by opening a downstream water-cut valve 66. The water-cut of the downstream liquid-phase cut can then be manually calculated and inputted into computing device 26, thereby eliminating the need for water-cut meter 60 and downstream water-signal line 62. Further, when downstream water-cut sample line 64 is employed in conjunction with water-cut meter 60 (as shown in FIG. 1), downstream water-cut sample line 64 can be used to verify the accuracy of water-cut meter 60.

After the downstream gas-phase flow rate gas-phase cut, the downstream liquid-phase flow rate, and the downstream water-cut are measured in downstream flow meter 22, the fluids comprising the downstream liquid and gas-phase cuts are physically recombined in pipeline 44. Pipeline 44 then transports the recombined fluid to central processing facility 14.

Computing device 26 can be any device operable to determine an adjusted multi-phase flow measurement for each individual well based on the measurements provided by upstream and downstream flow meters 20, 22 via lines 28, 52, 58, and 62. Computing device 26 determines the adjusted multi-phase flow measurement by allocating the measured downstream multi-phase flow to each individual well based on the measured upstream multi-phase flow. Preferably, computing device 26 is a computer program to perform the required allocation steps. The operation of computing device 26 is discussed in more detail below, with respect to FIG. 3.

Figure 2:
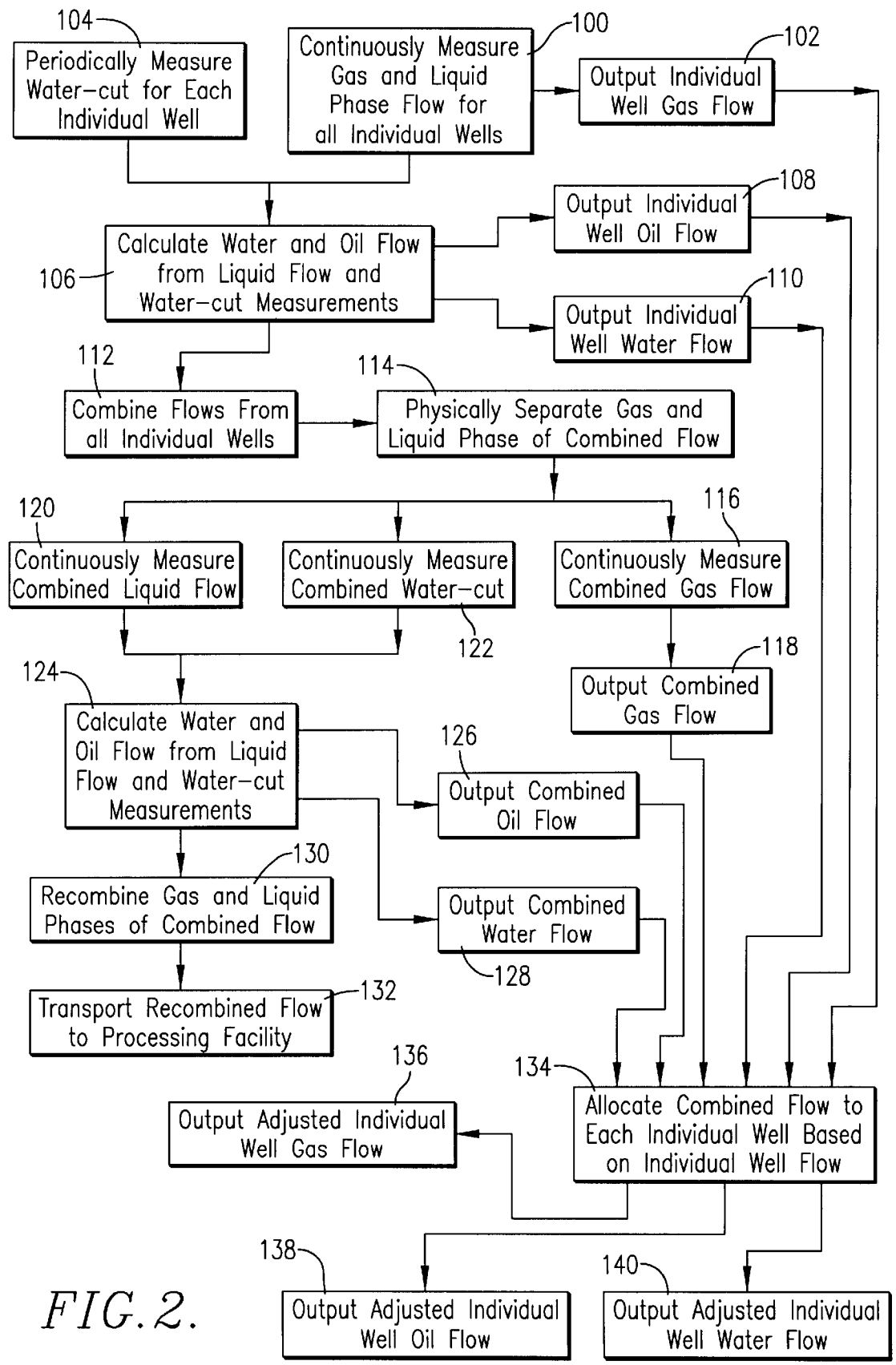
FIG. 2 is a flow chart diagram governing the operation of the system illustrated in FIG. 1 in accordance with an embodiment of the present invention.

FIG. 2 shows the steps required to perform a production metering and well testing process in accordance with one embodiment of the present invention. Referring now to FIGS. 1 and 2 in combination, in step 100, the gas and liquid flow rates of the fluid produced by each individual well 16 are continuously measured by upstream flow meters 20. In step 102, the measured upstream gas-phase flow rate for each individual well 16 is outputted from flow meter 20 for further processing. In step 104, the water-cut for each individual well 16 is periodically measured via water-cut sample line 30. In step 106, the water-cut measured in step 104 and the upstream liquid-phase flow rate measured in step 100 are used to calculate upstream water and oil flow rates. Step 106 is preferably performed by computing device 26, but can alternatively be performed manually or by a separate computing device and thereafter inputted into computing device 26. In steps 108 and 110, the upstream oil and water flow rates calculated in step 106 are outputted for further processing. In step 112, the fluids produced from individual wells 16 are physically combined in production header 18. In step 114, the combined fluid from all individual wells 16 are physically separated into a downstream gas-phase cut and a downstream liquid-phase cut by phase separator 46. In step 116, the downstream gas-phase flow rate of the downstream gas-phase cut is measured by gas flow meter 48 and, thereafter, outputted in step 118 for further processing. In step 120, the downstream liquid-phase flow rate of the downstream liquid-phase cut is measured by liquid flow meter 54. In step 122, the downstream water-cut of the downstream liquid-phase cut is continuously measured by water-cut meter 58. Optionally, step 122 can be performed by periodically sampling the downstream liquid-phase cut via downstream water-cut sample line 62 and manually determining the downstream water-cut. In step 124, the downstream liquid-phase flow rate determined in step 120 and the downstream water-cut determined in step 122 are used to calculate downstream oil and water flow rates. Preferably, step 124 is performed by computing device 26, however, any other computational method or device can also be employed. In steps 126 and 128, the downstream oil and water flow rates calculated in step 124 are outputted for further processing and/or interpretation. In step 130, the downstream liquid and gas-phase cuts are physically recombined in pipeline 44. In step 132, the recombined fluid is transported to central processing facility 14 via pipeline 44. In step 134, the downstream gas, oil, and water flow rates from steps 118, 126 and 128 are allocated back to each individual well 16 based on the upstream gas, oil, and water flow rates from steps 102, 108, and 110. The adjusted gas, oil, and water flow rates calculated in step 134 are outputted in steps 136, 138 and 140, respectively for further processing, interpretation, display, and/or storage.

Figure 3:
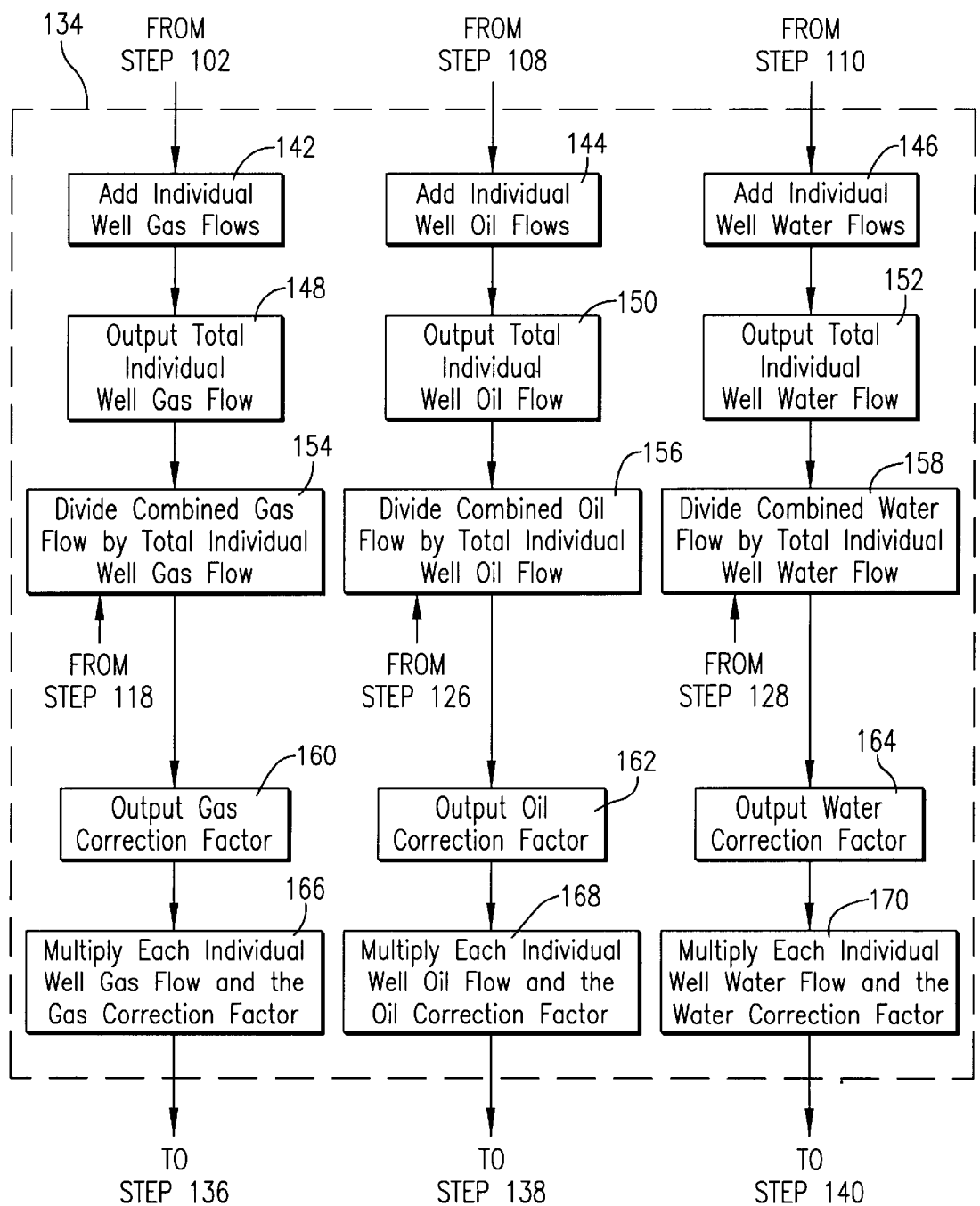
FIG. 3 is a flow chart diagram providing more detail about the steps involved in allocating the measured combined flow to each individual well based on the measured individual well flow.

FIG. 3 shows the sub-steps involved in allocation step 134 of FIG. 2. Referring now to FIGS. 1 and 3 in combination, in steps 142, 144, and 146, the upstream gas, oil, and water flow rates from steps 102, 108, and 110 are added together to generate a total gas, oil, and water flow rate as measured by upstream flow meters 20. In steps 148, 150, and 152, such total gas, oil, and water flow rates are outputted for further processing. In steps 154, 156, and 158, the downstream gas, oil, and water flow rates from steps 118, 126, and 128 are divided by the total gas, oil, and water flow rate values from steps 148, 150, and 152 to obtain gas, oil, and water correction factors. The calculated gas, oil, and water correction factors are essentially the ratio of the multi-phase flow from the entire production field 12 measured by downstream flow meter 22 to the multi-phase flow from the entire production field 12 measured by upstream flow meters 20. Ideally, the sum of the flows measured by upstream multi-phase flow meters 20 and the combined flows measured by downstream flow meter 22 would be the same. However, the design of downstream flow meter 22 allows it to be more accurate than upstream flow meter 20, and thus, the sum of the multi-phase flow values from the upstream flow meters 20 and the multi-phase flow values from downstream flow meter 22 will typically be different. Although it would be ideal to employ a flow metering system such as the one used for downstream flow meter 22 for each individual well 16 in order to obtain the most accurate individual well flow measurements, such a system design is economically impractical due to the cost of a flow meter system such as the downstream flow meter 22, which physically separates the gas and liquid phase fluids. In steps 160, 162, and 164, the gas, oil, and water correction factors from steps 154, 156, and 158 are outputted for further processing. In steps 166, 168, and 170, the gas, oil, and water correction factors from steps 160, 162, and 164 are multiplied by the upstream gas, oil, and water flow rates from steps 102, 108, and 110 to obtain adjusted gas, oil, and water flow rates for each individual well.

Thus, the present invention utilizes a highly accurate, but relatively expensive, downstream flow meter to obtain a highly accurate value for multi-phase flow from the entire production field 12. The present invention further utilizes a plurality of less accurate, but less expensive, upstream flow meters 20 to obtain a close estimate of multi-phase flow from each individual well 16. The highly accurate downstream multi phase flow measurement is then allocated back to each individual well based on the less accurate upstream flow measurements for each individual well 16 to thereby obtain an adjusted multi-phase flow measurement for each individual well 16 which is more accurate than the original upstream multi-phase flow measurement from upstream flow meter 20.

It is preferred for the computational process of step 134, as well as the computational processes of steps 106 and 124, to be carried out by computing device 26. Preferably, computing device 26 is a computer programmed to perform steps 106 and 124, as well as the substeps of step 134 (shown in FIG. 3). Various computers and programming methods for automating steps 106, 124, and 134 are well known in the art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of determining fluid production from a plurality of individual hydrocarbon wells, said method comprising the steps of:
   (a) simultaneously measuring a plurality of individual well multi-phase flow measurements, each indicative of the fluid produced by a respective one of the individual wells;
   (b) measuring a combined flow measurement of the combined fluid cooperatively produced by all of the individual wells; and
   (c) allocating the combined flow measurement from step (b) to each of the individual wells based on the individual well multi-phase flow measurements from step (a) to thereby determine an adjusted individual well multi-phase flow measurement for each individual well, said adjusted individual well multi-phase flow measurements providing a more reliable indication of actual multi-phase fluid production from each individual well than the individual well multi-phase flow measurements from step (a).

2. A method according to claim 1,
   step (c) including, determining a correction factor based on the combined flow measurement from step (b) and the total of the individual well multi-phase flow measurements from step (a).

3. A method according to claim 2,
   step (c) including, multiplying the individual well multi-phase flow measurements from step (a) and the correction factor to obtain the adjusted individual well multi-phase flow measurements.

4. A method according to claim 1; and
   (d) physically combining the fluid produced by each of the individual wells into a combined fluid, said combined fluid being measured in step (b).

5. A method according to claim 4, step (a) including the steps of:
   (a1) measuring an individual well liquid-phase flow rate of the fluid produced by each of the individual wells; and (a2) measuring an individual well gas-phase flow rate of the fluid produced by each of the individual wells.

6. A method according to claim 5; and (e) measuring an individual well water-cut of the fluid produced by each of the individual wells.

7. A method according to claim 6; and (f) calculating an individual well oil flow rate and an individual well water flow rate using the individual well liquid-phase flow rate and the individual well water-cut.

8. A method according to claim 7, step (b) including the steps of:

(b1) physically separating the combined fluid cooperatively produced by all the individual wells into a combined liquid-phase cut and a combined gas-phase cut;

(b2) measuring a combined gas-phase flow rate of the combined gas-phase cut;

(b3) measuring a combined liquid-phase flow rate of the combined liquid-phase cut; and (b4) measuring a combined water-cut of the combined liquid-phase cut.

9. A method according to claim 8; and (g) calculating a combined oil flow rate and a combined water flow rate using the combined liquid-phase flow rate and the combined water-cut.

10. A method according to claim 9, step (c) including the steps of:

(c1) adding all the individual well gas-phase flow rates to obtain a total individual well gas flow rate;

(c2) adding all the individual well oil flow rates to obtain a total individual well oil flow rate;

(c3) adding all the individual well water flow rates to obtain a total individual well water flow rate;

(c4) dividing the combined gas-phase flow rate by the total individual well gas flow rate to obtain a gas correction factor;

(c5) dividing the combined oil flow rate by the total individual well oil flow rate to obtain an oil correction factor;

(c6) dividing the combined water flow rate by the total individual well water flow rate to obtain a water correction factor;

(c7) multiplying each individual well gas-phase flow rate by the gas correction factor to obtain an adjusted individual well gas flow measurement for each respective individual well;

(c8) multiplying each individual well oil flow rate by the oil correction factor to obtain an adjusted individual well oil flow measurement for each respective individual well; and (c9) multiplying each individual well water flow rate by the water correction factor to obtain an adjusted individual well water flow measurement for each respective individual well.

11. A method according to claim 10, said adjusted individual well multi-phase flow measurement comprising the adjusted individual well gas flow measurement, the adjusted individual well oil flow measurement, and the adjusted individual well water flow measurement.

12. A method of determining fluid production from a plurality of individual hydrocarbon wells, said method comprising the steps of:

(a) simultaneously measuring an upstream multi-phase flow of the fluid produced by each individual well;

(b) generating a plurality of upstream flow signals each indicative of the upstream multi-phase flow of a respective individual well;

(c) measuring a downstream multi-phase flow of the combined fluid cooperatively produced by all of the individual wells;

(d) generating a downstream flow signal indicative of the downstream multi-phase flow of all the individual wells; and (e) computing an adjusted upstream multi-phase flow measurement based on the upstream and downstream flow signals by allocating the downstream multi-phase flow to each individual well based on the upstream multi-phase flow, said adjusted multi-phase flow measurement providing a more accurate indication of the actual multi-phase flow of the fluid produced by each individual well than said upstream multi-phase flow measured in step (a).

13. A method according to claim 12, said upstream multi-phase flow including an upstream gas-phase flow rate and an upstream liquid-phase flow rate, said downstream multi-phase flow including a downstream gas flow rate, a downstream water flow rate, and a downstream oil flow rate.

14. A method according to claim 13, step (c) including, physically separating the combined fluid produced by all of the individual wells into a downstream gas-phase cut and a downstream liquid-phase cut.

15. A method according to claim 14; and (f) measuring an upstream water-cut of the fluid produced from each individual well; and (g) determining an upstream water flow rate and an upstream oil flow rate from the upstream water-cut and the upstream liquid-phase flow rate for each individual well.

16. A method according to claim 15, step (e) including the steps of:

(e1) adding the upstream gas-phase flow rates for all the individual wells to obtain a total upstream gas flow rate;

(e2) adding the upstream water flow rates for all the individual wells to obtain a total upstream water flow rate;

(e3) adding the upstream oil flow rates for all the individual wells to obtain a total upstream oil flow rate;

(e4) dividing the downstream gas flow rate by the total upstream gas flow rate to obtain a gas correction factor;

(e5) dividing the downstream water flow rate by the total upstream water flow rate to obtain a water correction factor;

(e6) dividing the downstream oil flow rate by the total upstream oil flow rate to obtain an oil correction factor;

(e7) multiplying the upstream gas-phase flow rate for each individual well and the gas correction factor to obtain an adjusted upstream gas flow measurement for each respective individual well;

(e8) multiplying the upstream water flow rate for each individual well and the water correction factor to obtain an adjusted upstream water flow measurement for each respective individual well; and (e9) multiplying the upstream oil flow rate for each individual well and the oil correction factor to obtain an adjusted upstream oil flow measurement for each individual well.

17. A method of determining fluid production from a plurality of individual hydrocarbon wells, said method comprising the steps of:
(a) simultaneously measuring a plurality of upstream gas flow rates, each indicative of the flow rate of an upstream gas-phase component of the fluid produced by an individual well;
(b) simultaneously measuring a plurality of upstream liquid flow rates, each indicative of the flow rate of an upstream liquid-phase component of the fluid produced by an individual well;
(c) measuring a plurality of upstream water-cuts, each indicative of the amount of water in the upstream liquid-phase component of the fluid produced by an individual well;
(d) physically combining the fluids produced by all of the individual wells into a combined flow;
(e) physically separating the combined flow into a downstream gas-phase cut and a downstream liquid-phase cut;
(f) measuring a downstream gas flow rate indicative of the flow rate of the downstream gas-phase cut;
(g) measuring a downstream liquid flow rate indicative of the flow rate of the downstream liquid-phase cut; and
(h) allocating the downstream gas and liquid flow rates to each individual well based on the plurality of upstream gas and liquid flow rates to thereby determine adjusted individual well gas and liquid flow rates for each individual well, said adjusted individual well gas and liquid flow rates providing a more reliable indication of actual multi-phase fluid production from each individual well.

18. A method according to claim 17; and
(i) measuring a downstream water-cut of the downstream liquid-phase cut, said downstream water-cut indicative of the amount of water in the downstream liquid-phase cut.

19. A method according to claim 18,
(j) determining upstream water flow rates for each individual well using the upstream water-cuts and the upstream liquid flow rates.

20. A method according to claim 19, and
(k) determining upstream oil flow rates for each individual well using the upstream water-cuts and the upstream liquid flow rates.

21. A method according to claim 20; and
(l) determining a downstream water flow rate using the downstream water-cut and the downstream liquid flow rate.

22. A method according to claim 21; and
(m) determining a downstream oil flow rate using the downstream water-cut and the downstream liquid flow rate.

23. An apparatus for measuring fluid production from a plurality of individual hydrocarbon wells, said apparatus comprising:
a plurality of upstream metering devices each adapted to be fluidically coupled to a respective individual well, each of said upstream metering devices operable to measure an upstream multi-phase flow of the fluid produced by a respective individual well, each of said upstream metering devices operable to generate an upstream flow signal indicative of the upstream multi-phase flow of the respective individual well;
a downstream metering device adapted to be fluidically coupled to all of the individual wells, said downstream metering device operable to measure a downstream multi-phase flow of the combined fluid produced by all of the individual wells, said downstream metering device operable to generate a downstream flow signal indicative of the downstream multi-phase flow of the combined fluid produced by all the individual wells; and
a computing device operable to receive the upstream and downstream flow signals and compute a plurality of adjusted multi-phase individual well flow measurements by allocating the downstream multi-phase flow to each individual well based on the upstream multi-phase flow of each individual well.

24. An apparatus according to claim 23,
said upstream flow signal including an upstream gas-phase signal component indicative of an upstream gas-phase flow rate of the fluid produced by a respective individual well,
said upstream flow signal including an upstream liquid-phase signal component indicative of an upstream liquid-phase flow rate of the fluid produced by a respective individual well.

25. An apparatus according to claim 24,
said downstream flow signal including a downstream gas-phase signal component indicative of a downstream gas-phase flow rate of the combined fluid produced by all the individual wells,
said downstream flow signal including a downstream liquid-phase signal component indicative of a downstream liquid-phase flow rate of the combined fluid produced by all the individual wells.

26. An apparatus according to claim 25; and
an upstream water-cut device for providing an upstream water-cut measurement which can be used to allocate the upstream liquid-phase signal component into an upstream oil signal indicative of an upstream oil flow rate of the fluid produced by a respective individual well and an upstream water signal indicative of an upstream water flow rate of the fluid produced by a respective individual well; and
a downstream water-cut device for providing a downstream water-cut measurement which can be used to allocate the downstream liquid-phase signal component into a downstream oil signal indicative of a downstream oil flow rate of the combined fluid produced by all the individual wells and a downstream water signal indicative of a downstream water flow rate of the combined fluid produced by all the individual wells.

27. An apparatus according to claim 26, said computing device programmed to perform the following steps:
(a) add the upstream gas-phase flow rates of all the individual wells to obtain a total individual well gas flow rate;
(b) add the upstream water flow rates of all the individual wells to obtain a total individual well water flow rate;
(c) add the upstream oil flow rates of all the individual wells to obtain a total individual well oil flow rate;
(d) divide the downstream gas-flow rate by the total individual well gas flow rate to obtain a gas correction factor;

(e) divide the downstream water flow rate by the total individual well water flow rate to obtain a water correction factor;
(f) divide the downstream oil flow rate by the total individual well oil flow rate to obtain an oil correction factor;
(g) multiply the upstream gas-phase flow rate for each individual well and the gas correction factor to obtain an adjusted gas flow rate for each individual well;

(h) multiply the upstream water flow rate for each individual well and the water correction factor to obtain an adjusted water flow rate for each individual well; and
(i) multiply the upstream oil flow rate for each individual well and the oil correction factor to obtain an adjusted oil flow rate for each individual well.

* * * * *